Patented Sept. 19, 1950

2,523,245

UNITED STATES PATENT OFFICE 2,523,245

PROCESS FOR THE PREPARATION OF STREPTOMYCIN

Philip Dalton Coppock, Epsom Downs, England, assignor to The Distillers Company Limited, Edinburgh, Scotland, a British company No Drawing. Application September 13, 1948, Serial No. 49,118. In Great Britain September 19, 1947

7 Claims. (Cl. 195—107)

The present invention relates to an improvement in the manufacture of streptomycin, and refers in particular to the process for producing streptomycin by fermenting suitable nutrient media by means of micro-organisms such as *Actinomyces griseus*.

In the large scale fermentations of organic-nitrogenous substances such as peptone containing media under aerobic conditions, a persistent foam occurs, due apparently, to the increasing degradation of the albuminoid matter in the culture medium. This foam makes further aeration and the handling of the broth extremely difficult.

In order to prevent the formation of foam, anti-foam agents have been used. In breweries, for instance, milk has been used with success for said purpose. In other cases, such as for instance in the production of penicillin, by the fermentation of suitable media with penicillium notatum or similar micro-organisms, the addition of small amounts of arachis oil and/or high molecular weight monohydric alcohols has given satisfactory results as regards the prevention of troublesome foam.

When said anti-foam agents were tested in the production of streptomycin, it was found, however, that although preventing the formation of foam, they proved to be useless in practice because their application results in a considerable depression of the streptomycin titre in the fermented broth, caused apparently by reducing the production of streptomycin therein.

It has now been found that the process for the production of streptomycin can be carried out without impairing the titre of the resulting streptomycin solution by effecting the fermentation in the presence of a siloxane anti-foaming agent.

Accordingly the process of the present invention for the production of streptomycin solutions comprises fermenting suitable media by means of streptomycin producing micro-organisms such as *Actinomyces griseus* under aerobic conditions in the presence of an anti-foaming compound, consisting of a polymeric dihydrocarbon siloxane.

Polymeric dihydrocarbon siloxanes which are especially suitable for the process of the present invention are the liquid polymeric dimethyl siloxanes, and it is preferred to use those of the following general formulae:

I 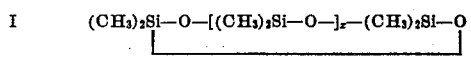

where $x$ is an integer; or

II 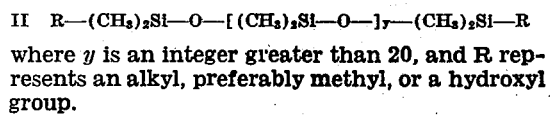

where $y$ is an integer greater than 20, and R represents an alkyl, preferably methyl, or a hydroxyl group.

Examples of compounds of the above formulae which may be used include decamethyl cyclopentasiloxane, octomethyl cyclotetrasiloxane and the polymeric dimethyl siloxane diols of the Formula II above where R is a hydroxyy group, which can be prepared by the hydrolysis of dimethyl dichloro silane. It should be noted that the present invention includes the use of a mixture of these polymeric dihydrocarbon siloxane compounds as well as the use of the pure materials themselves.

The amount of the said anti-foaming compound necessary for producing the desired effect of substantially suppressing the formation of foam during the fermentation process may vary within wide limits although very small quantities have been found adequate to prevent the formation of foam substantially completely. It has been found that the addition to the broth to be fermented of an amount of about 2 to 40 parts by weight of the said dihydrocarbon siloxane to one million parts by volume of the broth, is satisfactory. On the other hand, a slightly larger amount of the dihydrocarbon siloxane appears to have no inhibiting effect on the production of streptomycin, but of course, it is obviously uneconomic to employ a larger amount of the dihydrocarbon siloxane than is necessary, and in general the amount of the said siloxane used need not be in excess of 40 parts per million parts of broth.

It has been found, furthermore, that whilst the hitherto used anti-foaming agents, such as arachis oil, octadecanol, lard oil and maize oil, become ineffective in the course of the fermentation and therefore require to be replenished at intervals—a procedure which entails the risk of contaminating the broth by obnoxious micro-organisms—the said siloxane anti-foaming compounds added at the start of the broth remain effective during the whole fermentation process. In consequence, when the required amount of the siloxane compound is introduced into the broth to be fermented and sterilized therewith before inoculation in the ordinary way, no further addition becomes necessary. The possibility of an infection of the culture by the implementation of the antifoaming agent is thus completely obviated. It is, therefore, an additional feature of the invention to add the total amount of said dihydrocarbon siloxane required to prevent the formation of foam to the culture medium before the latter is sterilised, subsequently sterilise the broth, inoculate said broth with the suitable micro-organism, and proceed with the fermentation to the end whilst sterile air is passed through said broth without introducing additional amounts of said siloxane. The fermentation may be carried out while mechanically agitating the culture broth.

The following examples illustrate the ways in which the process of the invention may be carried out.

Example 1

To 2000 cc. of an aqueous culture medium containing:

| | Per cent by weight |
|---|---|
| Peptone | 0.5 |
| Meat extract | 0.3 |
| Glucose | 1.0 |
| Sodium chloride | 0.5 |
| MgSO$_4$.7H$_2$O | 0.025 |
| FeSO$_4$.7H$_2$O | 0.001 |
| Water | rest | is added 0.001% of liquid polymeric dimethyl siloxane and the medium is then sterilised. The fermentation medium is inoculated with 200 cc. of the same medium on which *Actinomyces griseus* had been grown after seeding with a spore suspension.

The fermentation is carried out at 28° C. during 5 days whilst the culture medium is stirred vigorously and aerated with sterile air at the rate of 2 litres per minute. At the end of said 5 days the streptomycin titre of the resulting broth amount to 153 u./cc.

When a culture medium of a similar composition to which was added before sterilisation 0.25% arachis oil containing 3% of octadecanol in the place of the dimethyl siloxane, was treated under identical conditions the titre obtained was only 5 u./cc.

The use of the same anti-foam agent, arachis oil, in conjunction with octadecanol, when added in a concentration of 0.1% after the fermentation had been proceeding for some time and after foaming had started in the fermentation vessel resulted in a broth with a titre of 51 u./cc.

The streptomycin may be recovered from the broth in the customary manner, for instance by adsorption with subsequent elution or the like.

Example 2

For comparative purposes a series of experiments were carried out employing maize oil, lard oil and liquid polymeric dimethyl siloxane as anti-foam agents. The fermentations were carried out as described in Example 1, employing various concentrations of the anti-foams. The results obtained were as follows:

| Antifoam | Amount as per cent by weight of the medium | Average titre per ml. of broth |
|---|---|---|
| Maize oil | 0.3 | 31.25 |
| Do | 0.5 | 33.4 |
| Do | 0.7 | 8.3 |
| Lard oil | 0.1 | 77 |
| Do | 0.3 | 77 |
| Do | 0.5 | 54 |
| Polymeric dimethyl siloxane | 30 P. P. M. | 176 |

It was found that the maize oil did not completely control foaming in any of the concentrations employed; the lard oil was only effective to control foaming in concentrations in excess of 1%. The polymeric dimethyl siloxane in the amount employed completely controlled foaming.

In similar experiments employing 0.5% by weight of milk as the anti-foam agent, it was found that although foaming was controlled, the streptomycin production in those experiments where milk was used was less than half that obtained in the control experiments where no anti-foam was employed.

Example 3

A set of five parallel fermentations were carried out, in each of which experiments 2 litres of an aqueous culture medium comprising

| | Per cent |
|---|---|
| Bacto peptone | 0.5 |
| Yeast extract | 0.3 |
| Glucose | 1.0 |
| Sodium chloride | 0.5 |
| Magnesium sulphate | 0.025 |
| Ferrous sulphate | 0.001 |
| Water | rest | was inoculated with an aqueous suspension of spores of *Actinomyces griseus*, and the fermentation carried out at 29° C. with aeration at the rate of 1½ volumes of air per volume of medium per minute. In one experiment no anti-foam compound was incorporated in the medium and in the other four experiments the siloxane antifoam compound shown in column 1 of the table below was incorporated in the medium in an amount comprising 20 parts of the anti-foam compound per million parts of the medium. The streptomycin titre of the broth obtained is given in column 2 below:

| Exp. | Column 1 | Column 2 |
|---|---|---|
| 1 | Polymeric dimethyl siloxane diol of B. P. above 250° C. at 2 mm./Hg | 63 |
| 2 | Polymeric dimethyl siloxane diol of B. P. below 250° C. at 2 mm./Hg | 79 |
| 3 | Decamethyl cyclopentasiloxane | 70 |
| 4 | Octamethyl cyclotetrasiloxane | 65 |
| 5 | No anti-foam | 62 |

In experiments 1–4 foaming was completely suppressed. In experiment 5 where no anti-foam compound was employed substantial foaming occurred.

Example 4

Four fermentations were carried out wherein 3 litres of an aqueous culture medium comprising

| | Per cent |
|---|---|
| Fish meal | 0.7 |
| Dried autolysed yeast | 0.3 |
| Glucose | 1.0 |
| Sodium chloride | 0.5 |
| Magnesium sulphate | 0.025 |
| Ferrous sulphate | 0.001 |
| Water | rest | and one of the siloxane anti-foams indicated below in an amount comprising 40 parts per million parts of the medium were inoculated with an aqueous suspension of spores of *Actinomyces griseus* and the fermentation carried out at 28° C., the medium being stirred at the rate of 900 R. P. M., and air being pumped through the medium at the rate of 1⅓ volumes of air per volume of medium per minute.

The fermentations were incubated for 4 days and the titre of the resulting broth as units of streptomycin per ml. of broth when using each siloxane anti-foam are given in the table below.

| Exp. | Siloxane Anti-foaming Compound | Titre |
|---|---|---|
| 1 | Polymeric diemthyl siloxane diol of B. P. above 250° C. at 2 mm./Hg. | 138 |
| 2 | Polymeric dimethyl siloxane diol of B. P. below 250° C. at 2 mm./Hg. | 171 |
| 3 | Decamethyl cyclopentasiloxane | 151 |
| 4 | Octamethyl cyclotetra siloxane | 171 |

In each experiment foaming during the fermentation was completely suppressed.

The polymeric dimethyl siloxane diols employed in Examples 3 and 4 are of the formula:

$$OH-(CH_3)_2Si-O-[(CH_3)_2Si-O-]_x-(CH_3)_2Si-OH$$

where $x$ is an integer in excess of about 200, and these compounds may be prepared by fractionating the hydrolysis product of dimethyl dichlorosilane.

The liquid siloxane anti-foaming compounds which are used according to the process of the present invention may be added to the culture medium either with or without dilution. However, in view of the minute quantity of the siloxane compound which is required for each fermentation, it may be advisable to employ a solution or dispersion of the siloxane compound in an inert solvent such as petroleum ether.

I claim:

1. A process for the production of streptomycin by the fermentation of a suitable culture medium by means of a streptomycin producing organism such as *Streptomyces griseus* under aerobic conditions which comprises carrying out the fermentation in the presence of an anti-foaming compound consisting of a dihydrocarbon siloxane.

2. A process for the production of streptomycin by the fermentation of a suitable culture medium by means of a streptomycin producing organism such as *Streptomyces griseus* under aerobic conditions which comprises carrying out the fermentation in the presence of 2 to 40 parts by weight of an anti-foaming compound consisting of a dihydrocarbon siloxane per million parts by weight of the culture medium.

3. A process for the production of streptomycin by the fermentation of a suitable culture medium by means of a streptomycin producing organism such as *Streptomyces griseus* under aerobic conditions which comprises carrying out the fermentation in the presence of an anti-foaming compound consisting of a dihydrocarbon siloxane in admixture with an inert diluent.

4. A process for the production of streptomycin by the fermentation of a suitable culture medium by means of a streptomycin producing organism such as *Streptomyces griseus* under aerobic conditions which comprises carrying out the fermentation in the presence of a liquid polymeric dimethyl siloxane.

5. A process for the production of streptomycin as claimed in claim 4, wherein the liquid polymeric dimethyl siloxane employed is of the following formula:

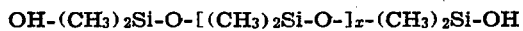

wherein $x$ is an integer.

6. A process for the production of streptomycin as claimed in claim 4, wherein the liquid polymeric dimethyl siloxane employed is of the following formula:

$$R-(CH_3)_2Si-O-[(CH_3)_2Si-O-]_y(CH_3)_2Si-R$$

where $y$ is an integer greater than 20 and R is an alkyl group.

7. A process for the production of streptomycin as claimed in claim 4, wherein the liquid polymeric dimethyl siloxane employed is of the following formula:

$$R-(CH_3)_2Si-O-[(CH_3)_2Si-O-]_y(CH_3)_2Si-R$$

where $y$ is an integer greater than 20 and R is a hydroxyl group.

PHILIP DALTON COPPOCK.

REFERENCES CITED

The following references are of record in the file of this patent:

UNITED STATES PATENTS

| Number | Name | Date |
| --- | --- | --- |
| 2,375,007 | Larsen | May 1, 1945 |
| 2,406,671 | Diamond | Aug. 27, 1946 |
| 2,416,504 | Trautman | Feb. 25, 1947 |
| 2,443,825 | Johnson | June 22, 1948 |
| 2,443,989 | Moyer | June 22, 1948 |
| 2,448,790 | Foster | Sept. 7, 1948 |